United States Patent [19]
de Mestral

[11] 3,805,386
[45] Apr. 23, 1974

[54] PARING KNIFE

[76] Inventor: George de Mestral, Commugny, Switzerland

[22] Filed: Aug. 25, 1972

[21] Appl. No.: 283,729

[30] Foreign Application Priority Data
Sept. 1, 1971 Switzerland.................. 12822/71

[52] U.S. Cl. ............................................. 30/278
[51] Int. Cl............................................. B26b 3/00
[58] Field of Search.......... 30/278, 279 R, 283, 280

[56] References Cited
UNITED STATES PATENTS
| | | | |
|---|---|---|---|
| 1,528,939 | 3/1925 | Massicotte | 30/278 |
| 727,396 | 5/1903 | Luhrman | 30/278 |
| 948,573 | 2/1910 | Chase | 30/279 R |
| 1,608,482 | 11/1926 | Cox | 30/279 R |

FOREIGN PATENTS OR APPLICATIONS
690,724  4/1953  Great Britain .................. 30/279 R Primary Examiner—Donald G. Kelly
Assistant Examiner—J. C. Peters
Attorney, Agent, or Firm—Emory L. Groff; Emory L. Groff, Jr.

[57] ABSTRACT

A paring knife comprises a cutting blade and a guide member extending side by side from a handle, with an outwardly diverging passageway open at its outer end defined between a cutting edge of the blade and a blunt edge of the member.

3 Claims, 7 Drawing Figures

PARING KNIFE

The invention relates to paring knives, for example for peelong vegetables, especially tuberous vegetables.

Known paring knives generally include a steel scraping blade secured to a handle, the blade including a longitudinal slot defined between parallel spaced-apart edges of the blade disposed in different planes, namely a sharp lower cutting edge and a rounded upper edge adapted to limit the thickness of the peel or cuttings.

Such paring knives are found to operate satisfactorily for peeling homogeneous tuberous vegetables such as potatoes, carrots, scorzonera and which do not have embryon buds or shoots emerging from their surface.

However, for peeling asparagus and similar vegetables, these paring knives are not satisfactory because the cuttings, which may include protruding buds or shoots, tend to block the slot between the cutting and guide edges, and manual removal of the blocked cuttings leads to a considerable waste of time.

An object of the invention is to obviate the above-indicated drawback in a paring knife of the type comprising a handle, a cutting blade of hard material and a blunt-edged guide member extending side-by-side from the handle, and a slit-like passageway defined between a cutting edge of the blade and a blunt edge of the guide member.

The improvement proposed by the invention is that the cutting and blunt edges diverge from one another along a direction away from the handle and define an outwardly-diverging passageway open at its outer end.

The accompanying drawings show, schematically and by way of example, two embodiments of paring knife according to the invention as well as a detail of a variation. In the drawings.

Figure 5:
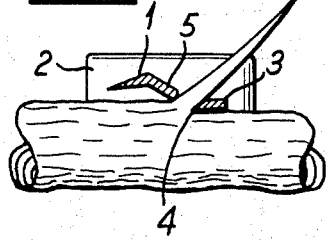
Figure 4:
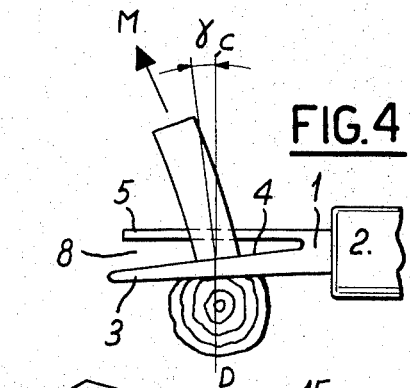

FIGS. 4 and 5 schematically illustrate the mode of use of the first embodiment of paring knife.

Figure 6:
Figure 7:
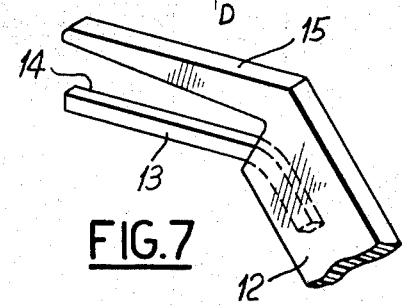

FIG. 6 is a transversal cross-section through part of a variation of the first embodiment; and FIG. 7 is a partial perspective view of the second embodiment.

Figure 1:
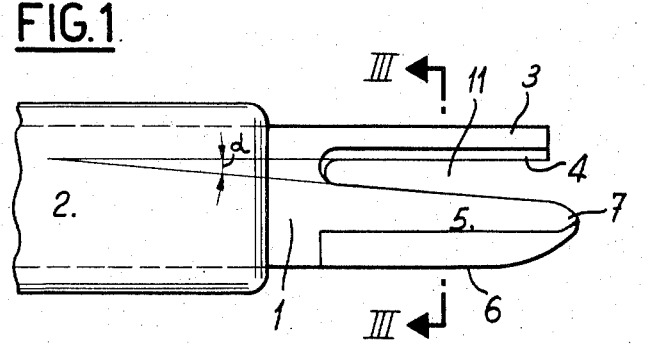
FIG. 1 is a partial plan view of a first embodiment of paring knife, shown on a slightly larger scale than in practice.
Figure 3:
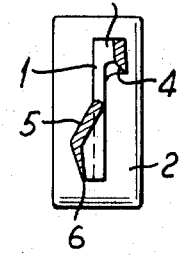
FIG. 3 is a cross-section taken along line III—III of FIG. 1.
Figure 2:
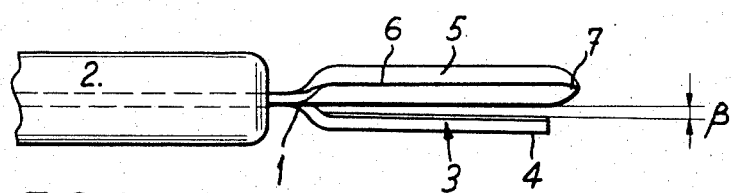
FIG. 2 is a partial side elevational view of the first embodiment.

The paring knife shown in FIGS. 1 to 3 comprises a metal plate 1 engaging in and fixed, in the same manner as for conventional knives, to a handle 2 in wood, synthetic plastic material or in metal.

Plate 1, which is in a highly resistant metal able to be sharpened by grinding, is stamped to provide a cutting blade 3 on which a cutting edge 4 is ground and a blunt-edged guide member 5 for adjusting the thickness of the cuttings, member 5 being out of the plane of the generally flat blade 3. The cutting edge 4 and blunt-edge of member 5 diverge from one another along a direction away from handle 2 with an angle $\alpha$ in the plane of FIG. 2 (i.e., parallel to the plane of blade 3) and an angle $\beta$ in the plane of FIG. 2, so as to define therebetween an outwardly-diverging passageway 11 open at its outer end.

The member 5 for adjusting the thickness of the cuttings is, as for known paring knives, provided with an additional exterior cutting edge 6 terminating with a rounded end 7, so that the knife can be used, for example, for cutting off the stalks of asparagus and for gouging out defective portions.

FIGS. 4 and 5 show how an asparagus may be peeled using the described paring knife. The thickness of the cuttings is limited by the member 5, and can thus be adjusted to a desired value by cutting with a selected part of blade 3. The cutting automatically passes out of passageway 11 in a direction M at an angle $\gamma$ to a plane CD perpendicular to the general axis of the knife. The oblique orientation of the cutting is due to the relative angular inclination of the blade 3 and member 5 (FIGS. 1 to 3); and the outcome of this inclination is that the cutting is expelled towards the left (FIG. 4), i.e., towards the free end 8 of passageway 11.

It can be understood that bud or shoot-like cuttings, for example asparagus tips, cannot accumulte between blade 3 and member 5 and are removed from the free end 8 or, if necessary, could be easily removed by hand.

The facing edges of blade 3 and member 5 could, instead of being rectilinear, be arcuate so as to progressively diverge from one another, in a manner to facilitate removal of the cuttings.

According to the variation shown in FIG. 6, the lower cutting blade 9, corresponding to blade 3 of FIGS. 1 to 3, is thick and rigid whilst the guide member, designated by 10, is somewhat thinner and is flexible, so as to be able to give way upon the passage of embryon buds or shoots, for example of asparagus.

The paring knives shown in FIGS. 1 to 6 are particularly suited for use by right handed persons. For left handed persons, it would be possible to provide a similar knife. It would also be possible, as for known paring knives, to provide a double purpose knife able to cut for both directions of movement. Such a knife would include two guide members and a central double-edged cutting blade.

In the second embodiment shown in FIG. 7, a handle 12 and guide member 15 are molded in one piece in synthetic resin. The cutting blade 13 is provided separately from member 15 and is mounted in a recess in the front end of handle 12 from which it extends in spaced-apart relationship to member 15. Cutting edge 14 of blade 13 forms an obtuse angle with the general direction of handle 12, as does the member 15. Thus, for a paring knife for right handed users, the cuttings are even better guided for ejection towards the left of the user.

The paring knife shown in FIG. 7 is particularly handy and if of a very low cost price, since blade 13 can be assembled with the handle 12 during the single molding operation.

Many other variations of the described embodiments can be envisaged. Thus, for example, a paring knife of the type shown in FIG. 1 could include a guide member 5, for adjusting the thickness of the cuttings, made in synthetic plastic material in a single piece with the handle 2, the metal blade 3 being fixed to the handle 2.

I claim:

1. A paring knife comprising a handle, a generally planar cutting blade cooperating with a blunt-edged guide member, said cutting blade secured at one of its ends to one end of the handle so as to form an obtuse angle therewith, the cutting edge of the blade and the blunt-edge of the guide member being positioned so as to diverge from one another both in the general plane of the blade and in a plane perpendicular to the general plane of the blade.

2. A paring knife as claimed in claim 1, in which the cutting blade and guide member are made in one piece which is secured to the handle.

3. A paring knife as claimed in claim 1, in which the handle and guide member are made in one piece and the cutting blade is secured to the end of the handle from which the guide member extends.

* * * * *

UNITED STATES PATENT OFFICE
CERTIFICATE OF CORRECTION

Patent No. 3,805,386             Dated April 23, 1974

Inventor(s) GEORGE DE MESTRAL

It is certified that error appears in the above-identified patent and that said Letters Patent are hereby corrected as shown below:

In Col. 1, line 4, change "peelong" to "peeling".

Signed and sealed this 17th day of September 1974.

(SEAL)
Attest:

McCOY M. GIBSON JR.           C. MARSHALL DANN
Attesting Officer             Commissioner of Patents